US009807746B2

(12) United States Patent
Lee

(10) Patent No.: US 9,807,746 B2
(45) Date of Patent: *Oct. 31, 2017

(54) METHOD OF HANDLING HYBRID AUTOMATIC REPEAT REQUEST FEEDBACK AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 112 days.

This patent is subject to a terminal disclaimer.

(21) Appl. No.: 13/802,832

(22) Filed: Mar. 14, 2013

(65) Prior Publication Data

US 2013/0265948 A1  Oct. 10, 2013

Related U.S. Application Data

(60) Provisional application No. 61/622,021, filed on Apr. 10, 2012, provisional application No. 61/643,361, filed on May 7, 2012.

(51) Int. Cl.
   *H04W 72/04* (2009.01)
   *H04L 1/18* (2006.01)

(52) U.S. Cl.
   CPC ......... *H04W 72/042* (2013.01); *H04L 1/1854* (2013.01); *H04L 1/1861* (2013.01); *H04L 1/1887* (2013.01); *H04L 1/1893* (2013.01)

(58) Field of Classification Search
   CPC .. H04W 72/042; H04L 1/1861; H04L 1/1854; H04L 1/1893; H04L 1/1887; H04L 1/1864; H04L 1/1896

(Continued)

(56) References Cited

U.S. PATENT DOCUMENTS

2010/0208679 A1* 8/2010 Papasakellariou et al. .. 370/329
2011/0176461 A1   7/2011 Astely
(Continued)

FOREIGN PATENT DOCUMENTS

CN   102045763 A   5/2011
CN   102202400 A   9/2011
(Continued)

OTHER PUBLICATIONS

Renesas Mobile Europe Ltd., HARQ Procedure for Full Duplex Mode in CC specific TDD configuration, 3GPP TSG-RAN WG1 Meeting #67, R1-113888, Nov. 14-18, 2011, XP050561969, San Francisco, CA, USA.

(Continued)

*Primary Examiner* — Michael Thier
*Assistant Examiner* — Rownak Islam
(74) *Attorney, Agent, or Firm* — Winston Hsu

(57) ABSTRACT

A method of handling a hybrid automatic repeat request (HARQ) feedback in a subframe for a first communication device in a wireless communication system comprises determining whether the HARQ feedback exists in a physical HARQ indicator channel (PHICH) in a downlink (DL) control region of the subframe transmitted by a network of the wireless communication system according to a first uplink (UL)/DL configuration of the first communication device and a second UL/DL configuration of a second communication device in the wireless communication system communicating with the network; detecting the HARQ feedback in the PHICH of the subframe, if the HARQ feedback exists in the PHICH; and detecting the HARQ feedback according to DL control information (DCI) in a physical DL control channel (PDCCH) in the DL control region, if the HARQ feedback does not exist in the PHICH.

16 Claims, 7 Drawing Sheets

(58) Field of Classification Search
USPC .................................. 370/329, 328, 310, 330
See application file for complete search history.

(56) References Cited

U.S. PATENT DOCUMENTS

| | | | |
|---|---|---|---|
| 2011/0176502 A1 | 7/2011 | Chung | |
| 2012/0026935 A1 | 2/2012 | Park | |
| 2012/0257554 A1 | 10/2012 | Kim | |
| 2013/0039299 A1* | 2/2013 | Papasakellariou et al. | .. 370/329 |
| 2013/0083740 A1* | 4/2013 | Eriksson | H04L 1/1861 370/329 |
| 2013/0188569 A1* | 7/2013 | He | H04W 28/16 370/329 |
| 2013/0194980 A1* | 8/2013 | Yin | H04L 1/1854 370/280 |
| 2013/0201926 A1* | 8/2013 | Nam et al. | 370/329 |
| 2013/0235821 A1* | 9/2013 | Chen | H04W 72/0406 370/329 |
| 2013/0242799 A1* | 9/2013 | Yin | H04L 1/1861 370/254 |
| 2014/0016589 A1 | 1/2014 | Kang | |
| 2014/0161004 A1 | 6/2014 | Wang | |

FOREIGN PATENT DOCUMENTS

| | | | |
|---|---|---|---|
| CN | 103368711 A | 10/2013 | |
| TW | 201215031 | 4/2012 | |
| TW | 201325172 | 6/2013 | |
| TW | 201342843 | 10/2013 | |
| WO | 2010074498 A2 | 7/2010 | |
| WO | 2011078581 A2 | 6/2011 | |
| WO | 2013113155 A1 | 8/2013 | |
| WO | WO 2013/113155 | * 8/2013 | ............... H04L 1/18 |
| WO | WO 2013/113155 A1 | * 8/2013 | ............... H04L 1/18 |
| WO | WO 2013/149390 | * 10/2013 | ............... H04L 1/18 |

OTHER PUBLICATIONS

Huawei, Hisilicon, Cross-carrier scheduling design for TDD inter-band CA with different UL-DL configurations, 3GPP TSG RAN WG1 Meeting #68, R1-120018, Feb. 6-10, 2012, XP050562607, Dresden, Germany.

Email Rapporteur (CMCC), Email summary on inter-band TDD CA, 3GPP TSG-RAN WG1 #69, R1-122708, May 21-25, 2012, XP050601167, Prague, Czech Republic.

3GPP TSG-RAN WG1 Meeting #66, R1-112349, "HARQ Feedback Mechanism in CA with Different TDD Configurations", Proposed by MediaTek Inc., Athens, Greece, Aug. 22-26, 2011, http://www.3gpp.org/ftp/tsg_ran/wg1_rl1/TSGR1_66/Docs/, p. 1-5.

3GPP TSG-RAN 1 #68bis, R1-121201, "Motivation, requirements and design for ePHICH",Proposed by Fujitsu, Jeju, Korea, Mar. 26-30, 2012, http://www.3gpp.org/DynaReport/TDocExMtg--R1-68b--29001.htm, p. 1-4.

* cited by examiner

| UL/DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| Legacy UE | 0 | $N_{PHICH}^{group}$ | - | - | $N_{PHICH}^{group}$ | 0 | $N_{PHICH}^{group}$ | - | - | $N_{PHICH}^{group}$ |
| Advanced UE | $N_{PHICH,new}^{group}$ | $N_{PHICH,new}^{group}$ | - | - | - | $N_{PHICH,new}^{group}$ | $N_{PHICH,new}^{group}$ | - | - | $N_{PHICH,new}^{group}$ |
| Number of PHICH groups | 0 | $N_{PHICH}^{group}$ | - | - | - | 0 | $N_{PHICH}^{group}$ | - | - | $N_{PHICH}^{group}$ |
| Detect HARQ according to DCI? | Yes | No | - | - | - | Yes | No | - | - | No |

| | | Subframe number | | | | | | | | | |
|---|---|---|---|---|---|---|---|---|---|---|---|
| UL/DL configuration | | 0 | 1 | 2 | 3 | 4 | 5 | 6 | 7 | 8 | 9 |
| Legacy UE | 0 | $N_{PHICH}^{group}$ | $N_{PHICH}^{group}$ | - | - | $N_{PHICH}^{group}$ | 0 | $N_{PHICH}^{group}$ | - | - | $N_{PHICH}^{group}$ |
| Advanced UE | | 0 | 0 | - | $N_{PHICH,new}^{group}$ | 0 | 0 | 0 | - | $N_{PHICH,new}^{group}$ | 0 |
| Number of PHICH groups | | / | / | - | 0 | / | / | / | - | 0 | / |
| Detect HARQ according to DCI? | | / | / | - | Yes | / | / | / | - | Yes | / |

FIG. 6

METHOD OF HANDLING HYBRID AUTOMATIC REPEAT REQUEST FEEDBACK AND RELATED COMMUNICATION DEVICE

CROSS REFERENCE TO RELATED APPLICATIONS

This application claims the benefit of U.S. Provisional Application No. 61/622,021, filed on Apr. 10, 2012 and entitled "Method for Assigning HARQ Indication Channel and Apparatus using the same", the contents of which are incorporated herein in their entirety.

BACKGROUND OF THE INVENTION

1. Field of the Invention

The present invention relates to a method used in a wireless communication system and related communication device, and more particularly, to a method of handling a hybrid automatic repeat request (HARQ) feedback and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system with frequency-division duplexing (FDD), transmission directions of subframes of a frequency band in the LTE/LTE-A system with time-division duplexing (TDD) may be different. That is, the subframes are divided into uplink (UL) subframes, downlink (DL) subframes and special subframes according to the UL/DL configuration specified in the 3GPP standard.

Please refer to FIG. 1 which is a table 10 of the UL/DL configuration with corresponding factors m for numbers of physical HARQ indicator channel (PHICH) groups, wherein the number of PHICH groups for a specific subframe is determined as $m \cdot N_{PHICH}^{group}$. In FIG. 1, 7 UL/DL configurations are shown, wherein each of the UL/DL configurations indicating a set of transmission directions for 10 subframes, respectively. In detail, "U" means that the subframe is a UL subframe where UL data is transmitted, and "D" means that the subframe is a DL subframe where DL data is transmitted. "S" means that the subframe is a special subframe where control information is transmitted, and the special subframe can also be simply seen as the DL subframe in the present invention. Since a HARQ feedback corresponding to a UL transmission can only be transmitted in the DL subframes, the number of PHICH groups $M \cdot N_{PHICH}^{group}$ is only nonzero for the DL subframes and the special subframes as shown in FIG. 1.

Furthermore, a UL/DL configuration of a legacy UE can be changed according to System Information Block Type 1 (SIB1) transmitted by an eNB, e.g., from the UL/DL configuration 1 to the UL/DL configuration 3. A minimum periodicity of transmitting the SIB1 is usually large (e.g., 640 ms), and the legacy UE can only change the UL/DL configuration with the periodicity of 640 ms. The semi-statics allocation cannot match fast varying traffic characteristics and environments, and there is space for improving system performance. Thus, changing the UL/DL configuration with a lower periodicity (e.g., lower than 640 ms) is considered.

In general, the legacy UE is configured with a UL/DL configuration according to the SIB1, and this UL/DL configuration is also known by an advanced UE which is configured with an additional UL/DL configuration. The additional configuration is a real configuration operated by the eNB, and the eNB provides services (i.e., performs transmissions and/or receptions) to both the legacy UE and the advanced UE according to the additional configuration. For backward compatibility, the eNB may schedule the legacy UE to avoid accessing a subframe that is configured with different transmission directions due to the UL/DL configuration and the real UL/DL configuration. That is, when the advanced UE which can change the UL/DL configuration fast operates in the LTE/LTE-A system, it may happen that the advanced UE intends to receive a HARQ feedback in a subframe (i.e., DL subframe) while the subframe is the UL subframe for the legacy UE. For example, the advanced UE and the legacy UE are configured with the UL/DL configurations 2 and 3, respectively, and the advanced UE intends to receive the HARQ feedback in the subframe 3. If the eNB simply transmits HARQ feedbacks of the UEs, the advanced UE can receive its HARQ feedback while the legacy UE lose its HARQ feedback without any UL transmission.

Alternatively, the advanced UE may intend to receive the HARQ feedback in a subframe (i.e., DL subframe) which is also the DL subframe for the legacy UE. However, the number of PHICH groups $m \cdot N_{PHICH}^{group}$ for the advanced UE is greater than the number of PHICH groups $m \cdot N_{PHICH}^{group}$ for the legacy UE due to different UL/DL configurations of the UEs, wherein $N_{PHICH}^{group}$ is a basic number of the PHICH groups and is usually broadcasted in master information block (MIB) via a physical broadcast channel (PBCH). For example, the advanced UE and the legacy UE are configured with the UL/DL configurations 0 and 6, respectively, and the advanced UE intends to receive the HARQ feedback in the subframe 5. The HARQ feedback can not be arranged in the PHICH with $2N_{PHICH}^{group}$ PHICH groups corresponding to the UL/DL configuration 0 of the advanced UE, since the legacy UE detects the PHICH according to a detecting rule for $N_{PHICH}^{group}$ PHICH groups and operation of the legacy UE should not be affected. The above situations usually occur when the advanced UE changes its UL/DL configuration while the legacy UE does not.

Thus, how to receive the HARQ feedback when the conflict occurs due to different UL/DL configurations of the UEs is an important topic to be discussed.

SUMMARY OF THE INVENTION

The present invention therefore provides a method and related communication device for handling a HARQ Feedback to solve the abovementioned problem.

A method of handling a hybrid automatic repeat request (HARQ) feedback in a subframe for a first communication device in a wireless communication system is disclosed. The method comprises determining whether the HARQ feedback exists in a physical HARQ indicator channel (PHICH) in a downlink (DL) control region of the subframe transmitted by a network of the wireless communication system according to a first uplink (UL)/DL configuration of the first communication device and a second UL/DL configuration of a second communication device in the wireless communication system communicating with the network; detecting the HARQ feedback in the PHICH of the subframe, if the HARQ feedback exists in the PHICH; and detecting the HARQ feedback according to DL control information (DCI) in a physical DL control channel (PDCCH) in the DL control region, if the HARQ feedback does not exist in the PHICH.

A method of handling a hybrid automatic repeat request (HARQ) feedback in a subframe for a network of a wireless communication system is disclosed. The method comprises determining whether the HARQ feedback is scheduled to exist in a physical HARQ indicator channel (PHICH) in a downlink (DL) control region of the subframe according to a first uplink (UL)/DL configuration of a first communication device in the wireless communication system and a second UL/DL configuration of a second communication device in the wireless communication system; arranging the HARQ feedback in the PHICH of the subframe, if the HARQ feedback is scheduled to exist in the PHICH; and arranging DL control information (DCI) in a physical DL control channel (PDCCH) in the DL control region according to the HARQ feedback, if the HARQ feedback is not scheduled to exist in the PHICH.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a table of the UL/DL configurations and receptions of the HARQ feedback according to an example to the present invention.

FIG. 6 is a table of the UL/DL configurations and receptions of the HARQ feedback according to an example to the present invention.

DETAILED DESCRIPTION

Figure 1:
FIG. 1 is a table of the UL/DL configuration with corresponding factors m for numbers of PHICH groups.
Figure 2:
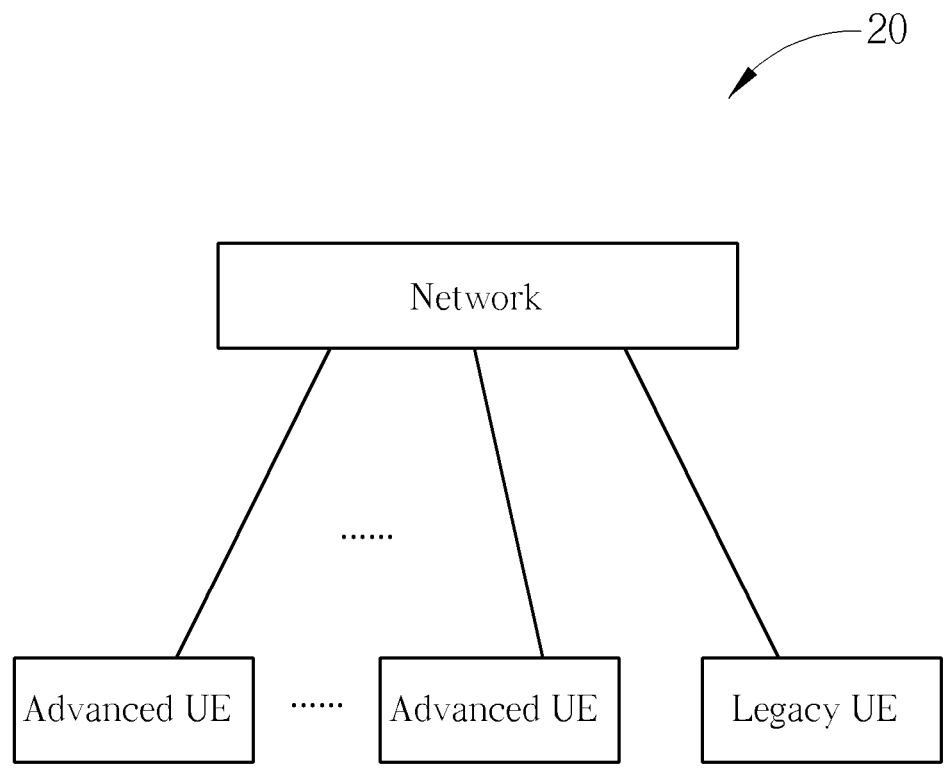
FIG. 2 is a schematic diagram of a wireless communication system according to an example the present invention.

Please refer to FIG. 2, which is a schematic diagram of a wireless communication system 20 according to an example of the present invention. The wireless communication system 20 is briefly composed of a network, advanced equipments (UEs) and a legacy UE. A minimum periodicity for changing an uplink (UL)/downlink (DL) configuration of an advanced UE is smaller than a minimum periodicity for changing a UL/DL configuration of the legacy UE. That is, the advanced UE can change its UL/DL configuration fast according to fast varying traffic characteristics and environments. Besides, the advanced UE know the UL/DL configuration of the legacy UE, e.g., according to System Information Block Type 1 (SIB1) transmitted by the network.

In FIG. 2, the network and the UEs are simply utilized for illustrating the structure of the wireless communication system 20. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE (advanced UE or legacy UE), the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A UE can be a mobile phone, a laptop, a tablet computer, an electronic book or a portable computer system. Besides, the network and the UE can be seen as a transmitter or a receiver according to transmission direction, e.g., for an uplink (UL), the UE is the transmitter and the network is the receiver, and for a downlink (DL), the network is the transmitter and the UE is the receiver.

Figure 3:
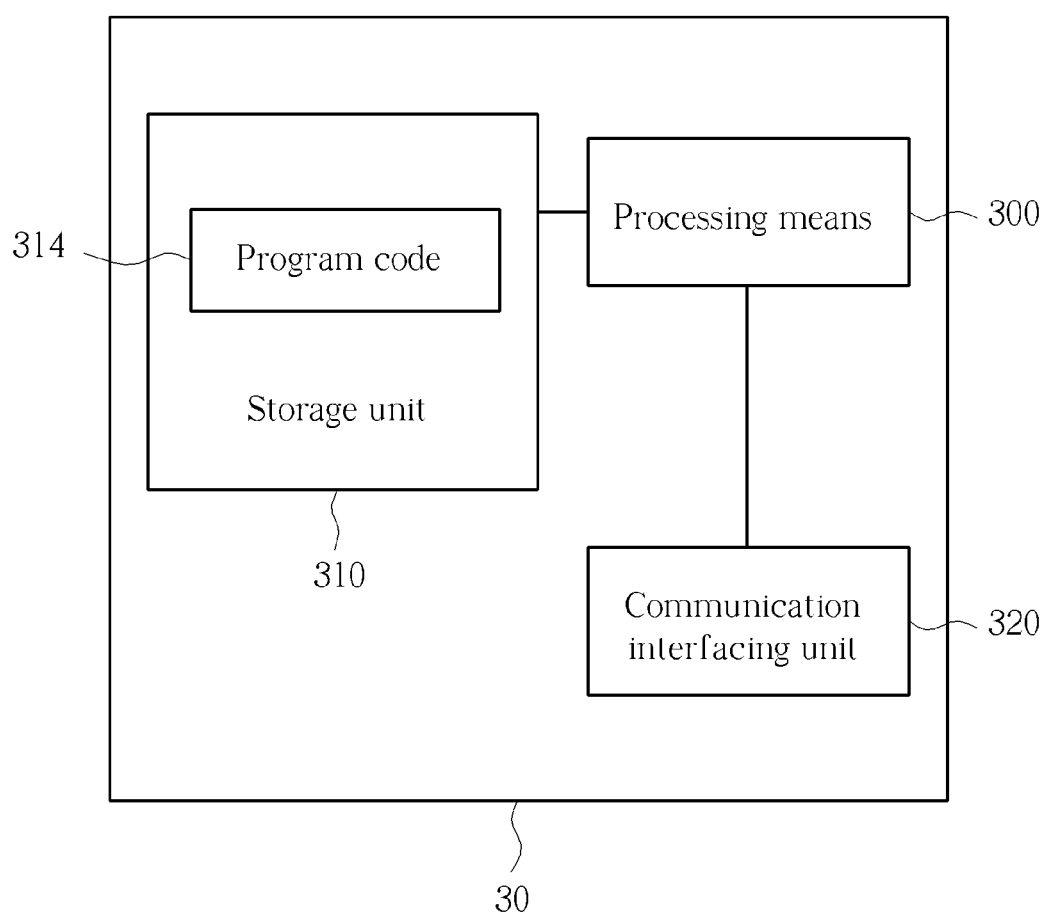
FIG. 3 is a schematic diagram of a communication device according to an example to the present invention.

Please refer to FIG. 3, which is a schematic diagram of a communication device 30 according to an example of the present invention. The communication device 30 can be an advanced UE, the legacy UE, or the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
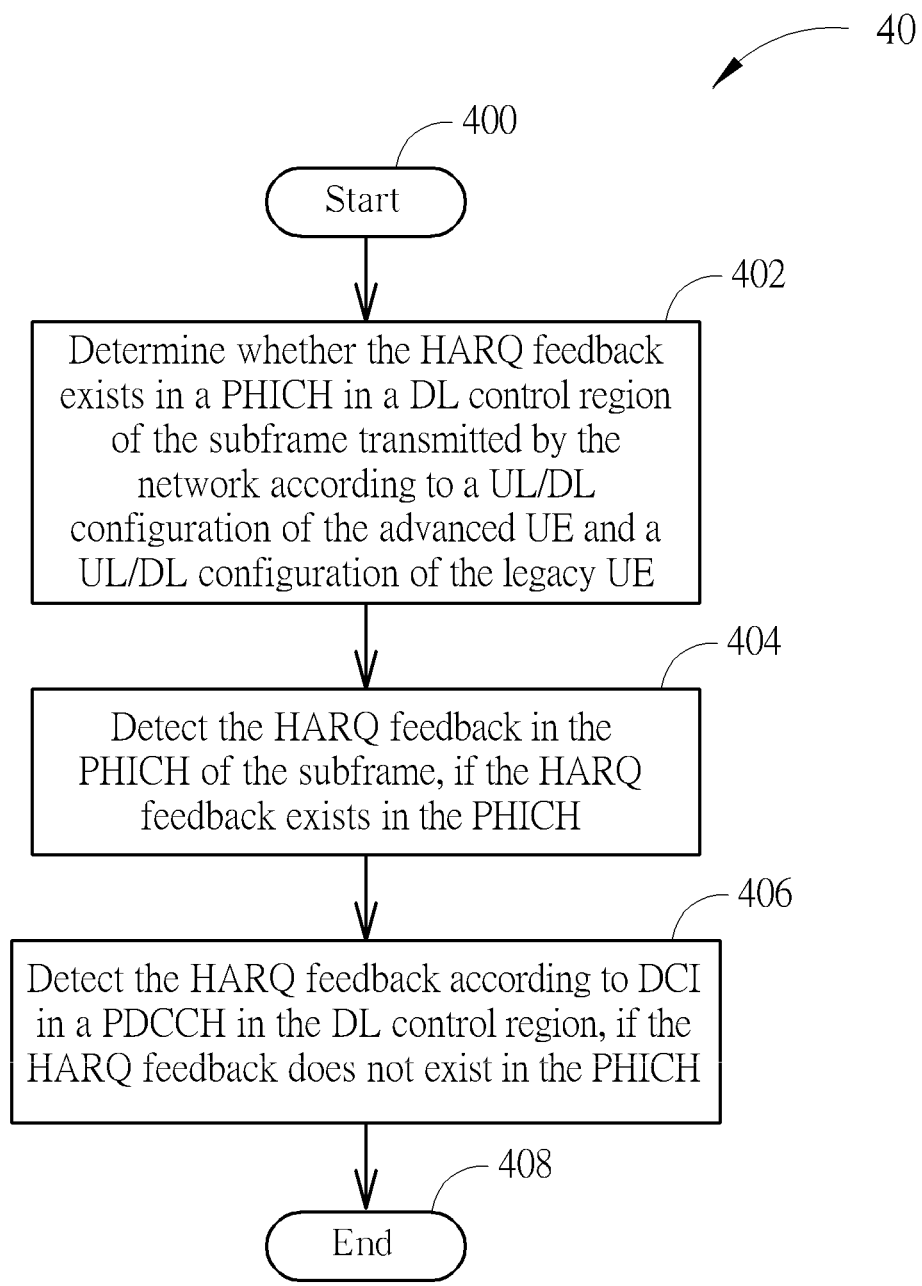
FIG. 4 is a flowchart of a process according to an example of the present invention.

Please refer to FIG. 4, which is a flowchart of a process 40 according to an example of the present invention. The process 40 is utilized an advanced UE shown in FIG. 2, for handling (e.g., detecting, demodulating and/or decoding) a hybrid automatic repeat request (HARQ) feedback in a subframe. The process 40 may be compiled into the program code 314 and includes the following steps:

Step 400: Start.

Step 402: Determine whether the HARQ feedback exists in a physical HARQ indicator channel (PHICH) in a DL control region of the subframe transmitted by the network according to a UL/DL configuration of the advanced UE and a UL/DL configuration of the legacy UE.

Step 404: Detect the HARQ feedback in the PHICH of the subframe, if the HARQ feedback exists in the PHICH.

Step 406: Detect the HARQ feedback according to DL control information (DCI) in a physical DL control channel (PDCCH) in the DL control region, if the HARQ feedback does not exist in the PHICH.

Step 408: End.

According to the process 40, the advanced UE determines whether the HARQ feedback exists in a PHICH in a DL control region of the subframe transmitted by the network according to a UL/DL configuration of the advanced UE and a UL/DL configuration of the legacy UE. Then, the advanced UE detects (e.g., receives, demodulates and/or decodes) the HARQ feedback in the PHICH of the subframe if the HARQ feedback exists in the PHICH, and detects the HARQ feedback according to DCI in a PDCCH in the DL control region if the HARQ feedback does not exist in the PHICH. That is, the advanced UE checks the DCI, if the advanced UE cannot find the HARQ feedback in the PHICH. Note that even if the UE has detected the HARQ feedback in the PHICH, the UE may still needs to detect the DCI. In this situation, if the DCI indicates a new UL transmission (e.g. in a UL grant), the UE concludes that the HARQ feedback indicates an acknowledgement (ACK). Since the conflict occurred due to different UL/DL configurations of the UEs is solved, the advance UE can change its UL/DL configuration fast according to fast varying traffic characteristics and environments while the legacy UE can still detect the HARQ feedback. Thus, performance of the wireless communication system can be improved.

Please note that, a method according to which the process 40 is realized is not limited. For example, the advanced UE can determine that the HARQ feedback does not exist in the PHICH, if a position of the HARQ feedback is outside the PHICH arranged according to the UL/DL configuration of the legacy UE. Besides, the advanced UE can determine the HARQ feedback does not exist in the PHICH, if the subframe is a UL subframe for the legacy UE. This can be seen as a result that the PHICH will not be arranged in the UL subframe, and the HARQ feedback is certainly outside the PHICH (i.e., outside the PHICH region). The abovementioned situations may happen, when a number of at least one PHICH group of the subframe corresponding to the UL/DL configuration of the advanced UE is greater than a number of at least one PHICH group of the subframe corresponding to the UL/DL configuration of the legacy UE.

Please refer to FIG. 5, which is a table 50 of the UL/DL configurations and receptions of the HARQ feedback according to an example to the present invention. As shown in FIG. 5, the advanced UE and the legacy UE are configured with the UL/DL configurations 6 and 1, respectively. For example, if the advanced UE determines the HARQ feedback exists in the PHICH of the subframe 1 (or the subframe 6 or 9), e.g., $N_{PHICH,new}^{group} \leq N_{PHICH}^{group}$ or the position of the HARQ feedback is not outside the PHICH arranged according to the UL/DL configuration 6, the advanced UE detects the HARQ feedback in the PHICH of the subframe 1 (or the subframe 6 or 9) with $N_{PHICH,new}^{group}$ PHICH groups, wherein $N_{PHICH,new}^{group}$ is a (new) basic number of PHICH groups for the advanced UE. In another example, if the advanced UE determines the HARQ feedback does not exist in the PHICH of the subframe 0 (or the subframe 5) according to $N_{PHICH,new}^{group} > 0$, i.e., the position of the HARQ feedback is outside the PHICH due to no PHICH is arranged for the legacy UE, the advanced UE detects the HARQ feedback according to the DCI in the PDCCH in the DL control region of the subframe 0 (or the subframe 5).

Please refer to FIG. 6, which is a table 60 of the UL/DL configurations and receptions of the HARQ feedback according to an example to the present invention. As shown in FIG. 6, the advanced UE and the legacy UE are configured with the UL/DL configurations 2 and 1, respectively. For example, if the advanced UE determines the HARQ feedback does not exist in the PHICH of the subframe 3 (or the subframe 8) according to $N_{PHICH,new}^{group} > 0$, i.e., the UL subframe is also considered as no PHICH is arranged for the legacy UE, the advanced UE detects the HARQ feedback according to the DCI in the PDCCH in the DL control region of the subframe 3 (or the subframe 8). The subframes 0-2, 4-7 and 9 are the UL subframes or no HARQ feedback to be detected for the advanced UE, and are not considered in the present example.

Please note that, there are methods for the advanced UE to detect the HARQ feedback according to the DCI. For example, the advanced UE determines that the HARQ feedback indicates an ACK, if the DCI indicating an UL retransmission does not exist in the PDCCH, and determines that the HARQ feedback indicates a negative acknowledgement (NACK), if the DCI indicating the UL retransmission exists in the PDCCH. Besides, in another example, the DCI can also be arranged in an enhanced PDCCH in a physical DL shared channel (PDSCH) of the subframe, and the advanced UE needs to detect the HARQ feedback according to the DCI in the ePDCCH. That is, the examples in the present invention can be realized, after the PDCCH is replaced by the ePDCCH. Situations in which the ePDCCH is used for carrying the DCI include the PDCCH is full, the PDCCH is removed according to the development of the standard, or the advanced UE is simply indicated by the network to detect the DCI in the ePDCCH, and is not limited herein. Furthermore, $N_{PHICH,new}^{group}$ stated above can be $N_{PHICH}^{group}$ (i.e., $N_{PHICH}^{group}$ is used by the advanced UE for obtaining the number of PHICH groups), multiples of $N_{PHICH}^{group}$, or can be a newly defined value for the advanced UE, and is not limited herein. $N_{PHICH,new}^{group}$ can be configured by a higher layer signaling. Alternatively, relation of $N_{PHICH,new}^{group} = y N_{PHICH}^{group}$ can be used, and y is configured by a higher layer signaling.

The process 40 and the above description can be applied to the case of carrier aggregation (CA), when 2 UL/DL configurations which correspond to 2 component carriers configured to the advanced UE, respectively, are considered. In detail, the advanced UE performs an UL transmission via the first component carrier corresponding to the first UL/DL configuration, and intends to receive a HARQ feedback triggered by (i.e., corresponding to) the UL transmission in a subframe via the second component carrier corresponding to the second UL/DL configuration. Then, the advanced UE determines whether the HARQ feedback exists in a PHICH in a DL control region of the subframe transmitted by the network according to the first UL/DL configuration and the second UL/DL configuration of the advanced UE. The advanced UE detects (e.g., receives, demodulates and/or decodes) the HARQ feedback in the PHICH of the subframe if the HARQ feedback exists in the PHICH, and detects the HARQ feedback according to DCI in a PDCCH in the DL control region if the PHICH does not exist in the PHICH. Whether the HARQ feedback exists in the PHICH can be determined according to the above description, and is not narrated herein.

Please note that, the advanced UE can obtain $N_{PHICH}^{group}$ and/or $N_{PHICH,new}^{group}$ via receiving system information or according to a predetermined rule (e.g., UE-specific configuration). Besides, the advanced UE can also determine whether the HARQ feedback exists in the PHICH according to a predetermined rule including determination results of different UL/DL configurations. Thus, the advanced UE does not need to compare the UL/DL configurations practically, and power consumption can be reduced.

Figure 7:
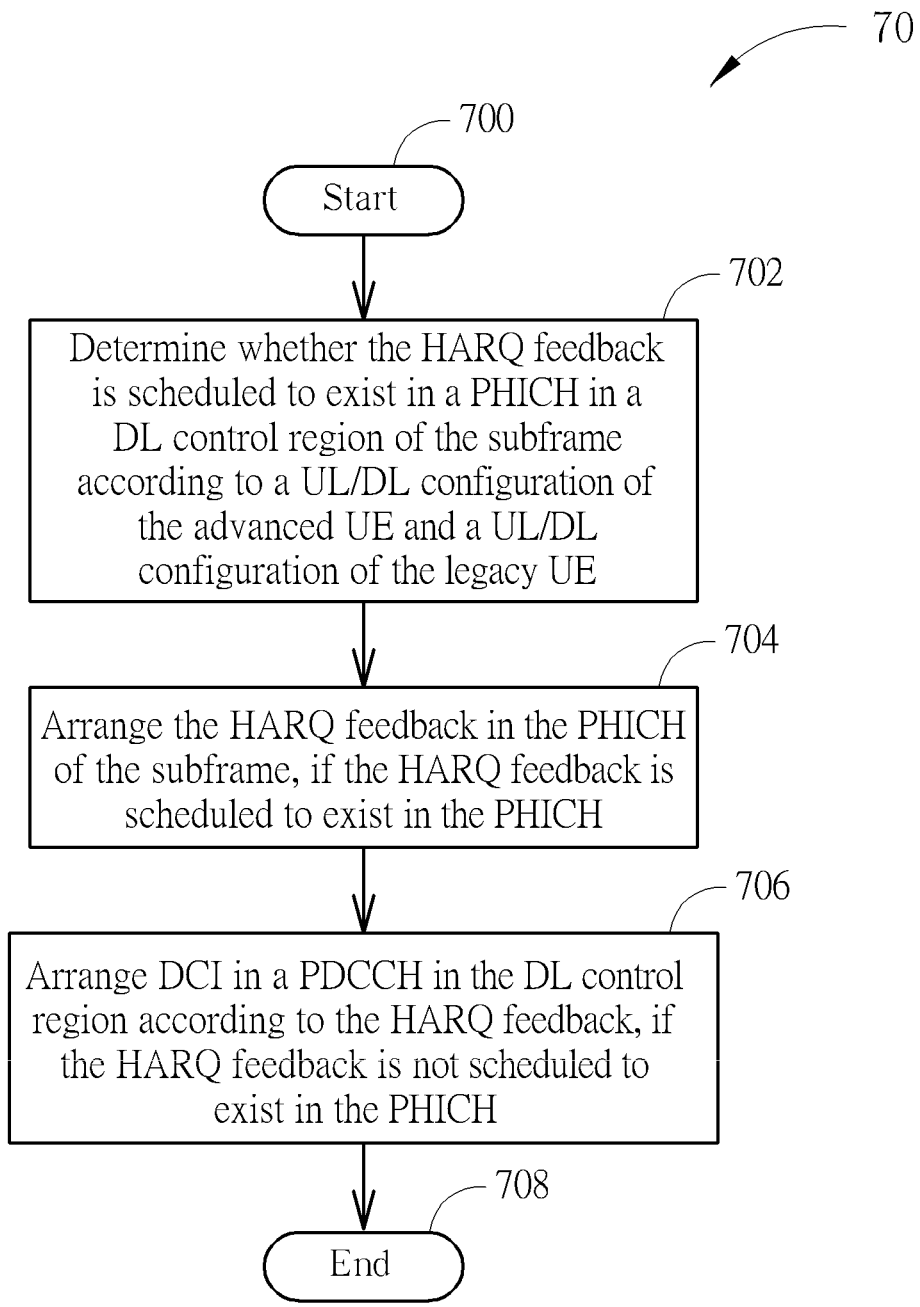
FIG. 7 is a flowchart of a process according to an example of the present invention.

Please refer to FIG. 7, which is a flowchart of a process 70 according to an example of the present invention. The process 70 is utilized the network shown in FIG. 2, for handling (e.g., arranging, modulating and/or encoding) a HARQ feedback in a subframe. Preferably, the process 70 can be seen as a process corresponding to the process 40, for the network to communicating with the advanced UE in which the process 40 is utilized. The process 70 may be compiled into the program code 314 and includes the following steps:

Step 700: Start.

Step 702: Determine whether the HARQ feedback is scheduled to exist in a PHICH in a DL control region of the subframe according to a UL/DL configuration of the advanced UE and a UL/DL configuration of the legacy UE.

Step 704: Arrange the HARQ feedback in the PHICH of the subframe, if the HARQ feedback is scheduled to exist in the PHICH.

Step 706: Arrange DCI in a PDCCH in the DL control region according to the HARQ feedback, if the HARQ feedback is not scheduled to exist in the PHICH.

Step 708: End.

According to the process 70, the network determines whether the HARQ feedback is scheduled to exist in a PHICH in a DL control region of the subframe according to a UL/DL configuration of the advanced UE and a UL/DL configuration of the legacy UE. Then, the network arranges the HARQ feedback in the PHICH of the subframe if the HARQ feedback is scheduled to exist in the PHICH, and arranges DCI in a PDCCH in the DL control region according to the HARQ feedback if the HARQ feedback is not scheduled to exist in the PHICH. For example, if the HARQ feedback is an ACK, the network may arrange the DCI without an UL grant or the DCI with a new transmission in the PDCCH. That is, the network uses the DCI for delivering the HARQ feedback, if the HARQ feedback cannot be scheduled in the PHICH. Since the conflict occurred due to different UL/DL configurations of the UEs is solved, the advance UE can change its UL/DL configuration fast according to fast varying traffic characteristics and environments while the legacy UE can still detect the HARQ feedback. Thus, performance of the wireless communication system can be improved.

Please note that, a method according to which the process 70 is realized is not limited. For example, the network can determine that the HARQ feedback is not scheduled to exist in the PHICH, if a position of the HARQ feedback is outside (e.g., no space inside for arranging the HARQ feedback) the PHICH arranged according to the UL/DL configuration of the legacy UE. Besides, the network can determine the HARQ feedback is not scheduled to exist in the PHICH, if the subframe is a UL subframe for the legacy UE. This can be seen as a result that the PHICH will not be arranged in the UL subframe, and the HARQ feedback is certainly outside the PHICH (i.e., outside the PHICH region). The above-mentioned situations may happen, when a number of at least one PHICH group of the subframe corresponding to the UL/DL configuration of the advanced UE is greater than a number of at least one PHICH group of the subframe corresponding to the UL/DL configuration of the legacy UE.

Please refer back to FIG. 5, if the network determines the HARQ feedback is scheduled to exist in the PHICH of the subframe 1 (or the subframe 6 or 9), e.g., $N_{PHICH,new}^{group} \leq N_{PHICH}^{group}$ or the position of the HARQ feedback is not outside the PHICH arranged according to the UL/DL configuration 6, the network arranges the HARQ feedback in the PHICH with $N_{PHICH,new}^{group}$ PHICH groups in the subframe 1 (or the subframe 6 or 9), wherein $N_{PHICH,new}^{group}$ is a (new) basic number of PHICH groups for the advanced UE. In another example, if the network determines the HARQ feedback is not scheduled to exist in the PHICH of the subframe 0 (or the subframe 5) according to $N_{PHICH,new}^{group}>0$, i.e., the position of the HARQ feedback is outside the PHICH due to no PHICH is arranged for the legacy UE, the network arranges the DCI in the PDCCH in the DL control region of the subframe 0 (or the subframe 5).

Please refer back to FIG. 6, if the network determines the HARQ feedback is not scheduled to exist in the PHICH of the subframe 3 (or the subframe 8) according to $N_{PHICH,new}^{group}>0$, i.e., the UL subframe is also considered as no PHICH, the network arranges the DCI in the PDCCH in the DL control region of the subframe 3 (or the subframe 8) according to the HARQ feedback. The subframes 0-2, 4-7 and 9 are the UL subframes or no HARQ feedback to be detected for the advanced UE, and are not considered in the present example.

Please note that, there are methods for the network to arrange the DCI according to the HARQ feedback. For example, the network stops arranging the DCI indicating an UL retransmission in the PDCCH if the HARQ feedback (to be transmitted) is an ACK, and arranges the DCI indicating the UL retransmission in the PDCCH if the HARQ feedback is a NACK. Besides, in another example, the network can also arrange the DCI in an enhanced PDCCH in a physical DL shared channel (PDSCH) of the subframe according to the HARQ feedback. That is, the examples in the present invention can be realized, after the PDCCH is replaced by the ePDCCH. Situations in which the ePDCCH is used for carrying the DCI include the PDCCH is full, the PDCCH is removed according to the development of the standard, or the network simply indicates the advanced UE to detect the DCI in the ePDCCH, and is not limited herein. Furthermore, $N_{PHICH,new}^{group}$ stated above can be $N_{PHICH}^{group}$ (i.e., $N_{PHICH}^{group}$ is used by the advanced UE for obtaining the number of PHICH groups), multiples of $N_{PHICH}^{group}$, or can be a newly defined value for the advanced UE, and is not limited herein. $N_{PHICH,new}^{group}$ can be configured by a higher layer signaling. Alternatively, relation of $N_{PHICH,new}^{group}=yN_{PHICH}^{group}$ can be used, and y is configured by a higher layer signaling.

The process 70 and the above description can be applied to the case of CA, when 2 UL/DL configurations which correspond to 2 component carriers configured to the advanced UE, respectively, are considered. In detail, the network receives an UL transmission via the first component carrier corresponding to the first UL/DL configuration, and intends to transmit a HARQ feedback triggered by (i.e., corresponding to) the UL transmission to the advanced UE via the second component carrier corresponding to the second UL/DL configuration. Then, the network determines whether the HARQ feedback is scheduled to exist in a PHICH in a DL control region of the subframe according to the first UL/DL configuration and the second UL/DL configuration of the advanced UE. The network arranges (e.g., transmits, modulates and/or encodes) the HARQ feedback in the PHICH if the HARQ feedback is scheduled to exist in the PHICH, and arranges DCI in a PDCCH in the DL control region according to the HARQ feedback if the HARQ feedback is not scheduled to exist in the PHICH. Whether the HARQ feedback is scheduled to exist in the PHICH can be determined according to the above description, and is not narrated herein.

Similarly, the network can also determine whether the HARQ feedback is scheduled to exist in the PHICH according to a predetermined rule including determination results of different UL/DL configurations. Thus, the network does not need to compare the UL/DL configurations practically, and power consumption can be reduced.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method for handling a HARQ feedback. Since the conflict occurred due to different UL/DL configurations of the advanced UE and the legacy UE is solved, the advance UE can change its UL/DL configuration fast according to fast varying traffic characteristics and environments while the legacy UE can still detect the HARQ feedback. Thus, performance of the wireless communication system can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a hybrid automatic repeat request (HARQ) feedback in a subframe for a first communication device in a wireless communication system according to a first uplink (UL)/downlink (DL) configuration and a second UL/DL configuration, the method comprising:
    determining whether the HARQ feedback exists in a physical HARQ indicator channel (PHICH) in a DL control region of the subframe transmitted by a network of the wireless communication system according to the first UL/DL configuration of the first communication device and the second UL/DL configuration of a second communication device in the wireless communication system communicating with the network, wherein the first UL/DL configuration and the second UL/DL configuration are different;
    detecting the HARQ feedback in the PHICH of the subframe and detecting the HARQ feedback according to DL control information (DCI) in a physical DL control channel (PDCCH) in the DL control region, if the HARQ feedback exists in the PHICH; and
    detecting the HARQ feedback according to the DCI in the PDCCH in the DL control region, if the HARQ feedback does not exist in the PHICH.

2. The method of claim 1, wherein the first communication device determines the HARQ feedback does not exist in the PHICH, if a position of the HARQ feedback is outside the PHICH arranged or no PHICH arranged according to the second UL/DL configuration.

3. The method of claim 1, wherein the first communication device determines the HARQ feedback does not exist in the PHICH, if the subframe is a UL subframe for the second communication device according to the second UL/DL configuration.

4. The method of claim 1, wherein the step of detecting the HARQ feedback according to the DCI in the PDCCH in the DL control region comprises:
    determining that the HARQ feedback indicates an acknowledgement (ACK), if the DCI indicating an UL retransmission does not exist in the PDCCH; and
    determining that the HARQ feedback indicates a negative acknowledgement (NACK), if the DCI indicating the UL retransmission exists in the PDCCH.

5. The method of claim 1, wherein a first minimum periodicity for changing the first UL/DL configuration is smaller than a second minimum periodicity for changing the second UL/DL configuration.

6. The method of claim 1, wherein the first communication device and the second communication device are the same communication device, the first UL/DL configuration is corresponding to a first component carrier on which an UL transmission triggering the HARQ feedback is performed, and the second UL/DL configuration is corresponding to a second component carrier on which the HARQ feedback is transmitted.

7. The method of claim 1, wherein the PDCCH is an enhanced PDCCH (ePDCCH) in a physical DL shared channel (PDSCH) of the subframe.

8. The method of claim 1, wherein a basic number of PHICH groups for arranging the HARQ feedback is a newly defined value for the first communication device.

9. A method of handling a hybrid automatic repeat request (HARQ) feedback in a subframe for a network of a wireless communication system according to a first uplink (UL)/downlink (DL) configuration and a second UL/DL configuration, the method comprising:
    determining whether the HARQ feedback is scheduled to exist in a physical HARQ indicator channel (PHICH) in a DL control region of the subframe according to the first UL/DL configuration of a first communication device in the wireless communication system and the second UL/DL configuration of a second communication device in the wireless communication system, wherein the first UL/DL configuration and the second UL/DL configuration are different;
    arranging the HARQ feedback in the PHICH of the subframe, if the HARQ feedback is scheduled to exist in the PHICH; and
    arranging DL control information (DCI) in a physical DL control channel (PDCCH) in the DL control region according to the HARQ feedback, if the HARQ feedback is not scheduled to exist in the PHICH.

10. The method of claim 9, wherein the network determines the HARQ feedback is not scheduled to exist in the PHICH, if a position of the HARQ feedback is outside the PHICH arranged or no PHICH arranged according to the second UL/DL configuration.

11. The method of claim 9, wherein the network determines the HARQ feedback is not scheduled to exist in the PHICH, if the subframe is a UL subframe for the second communication device according the second UL/DL configuration.

12. The method of claim 9, wherein the step of arranging the DCI in the PDCCH in the DL control region according to the HARQ feedback comprises:

stop arranging the DCI indicating an UL retransmission in the PDCCH, if the HARQ feedback is an acknowledgement (ACK); and arranging the DCI indicating the UL retransmission in the PDCCH, if the HARQ feedback is a negative acknowledgement (NACK).

13. The method of claim 9, wherein a first minimum periodicity for changing the first UL/DL configuration is smaller than a second minimum periodicity for changing the second UL/DL configuration.

14. The method of claim 9, wherein the first communication device and the second communication device are the same communication device, the first UL/DL configuration is corresponding to a first component carrier on which an UL transmission triggering the HARQ feedback is performed, and the second UL/DL configuration is corresponding to a second component carrier on which the HARQ feedback is transmitted.

15. The method of claim 9, wherein the PDCCH is an enhanced PDCCH (ePDCCH) in a physical DL shared channel (PDSCH) of the subframe.

16. The method of claim 9, wherein a basic number of PHICH groups for arranging the HARQ feedback is a newly defined value for the first communication device.

* * * * *